United States Patent [19]

Kitamura

[11] Patent Number: 4,924,076

[45] Date of Patent: May 8, 1990

[54] MEMORY CARD HOUSING A SEMICONDUCTOR DEVICE

[75] Inventor: Mamoru Kitamura, Itami, Japan

[73] Assignee: Mitsubishi Denki Kabushiki Kaisha, Japan

[21] Appl. No.: 217,294

[22] Filed: Jul. 11, 1988

[30] Foreign Application Priority Data

Jul. 14, 1987 [JP] Japan .............................. 62-176294

[51] Int. Cl.⁵ ...................... G06K 19/00; G06K 19/04
[52] U.S. Cl. ................................... 235/492; 235/487; 902/26; 361/395
[58] Field of Search ............... 235/380, 487, 488, 492; 902/26; 361/395, 399, 392

[56] References Cited

U.S. PATENT DOCUMENTS 4,766,519  8/1988  Heiland ................................ 361/399
4,780,791 10/1988  Morita et al. ....................... 361/399
4,798,946  1/1989  Fujii et al. ........................... 235/492

FOREIGN PATENT DOCUMENTS 61-3288   1/1986  Japan .................................. 235/487
61-15289  1/1986  Japan .................................. 235/487
61-222714 10/1986  Japan .

Primary Examiner—Aristotelis M. Psitos
Assistant Examiner—Robert A. Weinhardt
Attorney, Agent, or Firm—Leydig, Voit & Mayer

[57] ABSTRACT

A memory card has an outer package comprising a first and a second package section which enclose a semiconductor device. An electrical connector is housed within the front end of the outer package. The front end of each package section overlaps the rear end of the electrical connector so that there are no gaps between the electrical connector and the package sections which could allow dirt or other contaminants to enter the outer package.

5 Claims, 2 Drawing Sheets

MEMORY CARD HOUSING A SEMICONDUCTOR DEVICE

BACKGROUND OF THE INVENTION

This invention relates to a memory card which houses a semiconductor device and more particularly, to a memory card having an improved plastic outer package which enables the memory card to be manufactured more easily and cheaply than a conventional memory card.

In recent years, external memory devices have been developed which comprise a thin, card-like, plastic outer package which houses a semiconductor device and an electrical connector for electrically connecting the semiconductor device to external equipment. These memory devices, which will be referred to hereinunder as memory cards, have found widespread use as storage devices for data and programs for video games and microcomputers. FIG. 1 is a perspective view of a conventional memory card of the type to which the present invention pertains, FIGS. 2 and 3 are respectively a top and a bottom view thereof, and FIG. 4 is a longitudinal cross-sectional view of the left end of the memory card of FIG. 1. As shown in these figures, a conventional memory card has a plastic outer package consisting of an upper package section 1 and a lower package section 2 which are stacked atop one another. The two package sections surround and protect an internal base 3 which has an unillustrated semiconductor device mounted thereon. The outer package has a rectangular cavity at its front end into which an electrical connector 7 is inserted. The connector 7 has a plurality of sockets formed therein which are electrically connected to the unillustrated semiconductor device on the internal base 3 by leads 4 and 5, which are connected to the internal base 3 by solder 6.

A conventional memory card of this type is assembled by first disposing the internal base 3 and the connector 7 inside the lower package section 2 and then combining the upper package section 1 with the lower package section 1. Due to the clearances between the various parts which are necessary for assembly, gaps 8 are inevitably produced between the rear end of the connector 7 and the front portions of the package sections 1 and 2. The memory card at this stage of assembly appears as shown in FIGS. 2 and 3. If these gaps 8 were not filled, not only would the electrical leads 4 and 5 be visible through the gaps 8, but it would be possible for dirt and other contaminants to enter into the outer package through the gaps 8, produce electrical shorts, and damage the semiconductor device mounted on the internal base 3. Furthermore, as the distance from the outer surfaces of the leads 4 and 5 to the outer surfaces of the package sections 1 and 2 and the internal base 3 is quite small, the semiconductor device which is mounted on the internal base 3 could be damaged by static electricity. For this reason, at the time of assembly, an electrically-insulating resin 9 is applied around the periphery of the leads 4 and 5 to insulate the leads and fill the gaps 8. On account of the need to apply this resin 9, material costs and the complexity of the assembly process are increased, resulting in increased manufacturing costs.

SUMMARY OF THE INVENTION

Accordingly, it is an object of the present invention to provide a memory card having an outer package which has no gaps between the front end of the outer package and the rear end of an electrical connector which is housed in the front end of the outer package.

It is another object of the present invention to provide a memory card which is cheaper to manufacture than a conventional memory card.

A memory card in accordance with the present invention comprises an outer package, a semiconductor device, which is mounted on an internal base which is housed within the outer package, and an electrical connector, which is housed in the front end of the outer package, are electrically connected and can be electrically connected to external equipment. The outer package comprises a plurality of package sections which are stacked atop one another and bonded together on their confronting surfaces. The front portion of each package section overlaps the rear end of the electrical connector so that there is no gap therebetween. Since there are no gaps, the memory card can be assembled without having to apply a resin to the leads of the electrical connector, resulting in a decrease in the cost and an increase in the case of manufacture.

BRIEF DESCRIPTION OF THE DRAWINGS

In the figures, the same reference numerals indicate the same or corresponding parts.

DESCRIPTION OF THE PREFERRED EMBODIMENTS

Figure 5:
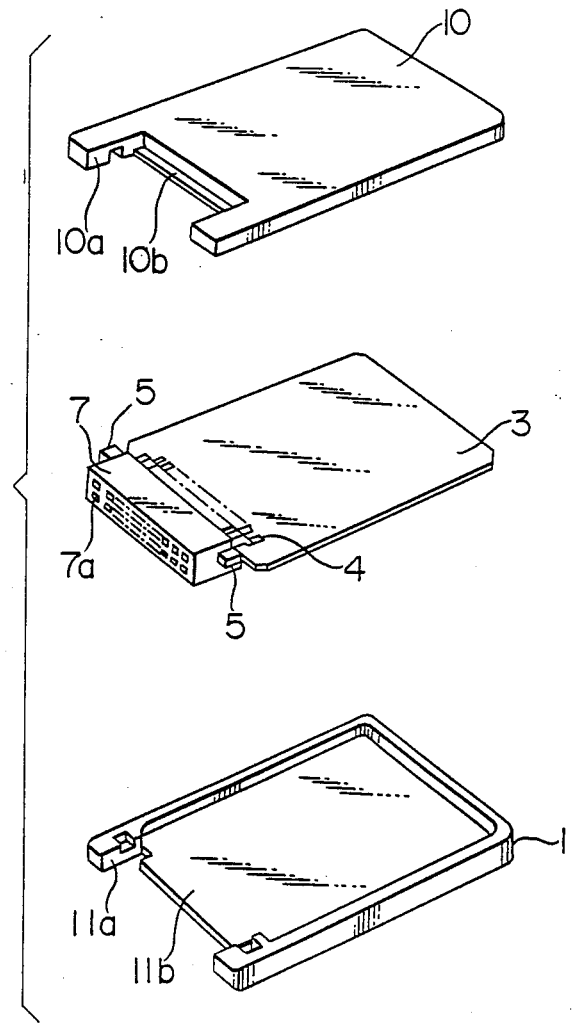
FIG. 5 is an exploded perspective view of a first embodiment of a memory card in accordance with the present invention.

Hereinbelow, a number of preferred embodiments of a memory card in accordance with the present invention will be described while referring to the accompanying drawings, FIGS. 5 and 6 of which illustrate a first embodiment. As shown in FIG. 5, a memory card in accordance with the present invention has an outer package comprising a first package section 10 and a second package section 11 which, when stacked atop one another, enclosre and protect an internal base 3 on which is mounted an unillustrated semiconductor device. Each of the package sections 10 and 11 has a flat base on the outer periphery of which is formed a generaly U-shaped raised rim which confronts and is bonded to the rim of the other package section. Both package sections 10 and 11 are made of an electrically-insulating material such as a synthetic resin. A conventional electrical connector 7 is secured to the front end of the internal base 3, and the leads 4 and 5 of the connector 7 are connected to the internal base 3 with solder 6. The connector 7 is disposed inside rectangular openings 10a and 11a formed in the front ends of the package sections 10 and 11, respectively. The connector 7 has a plurality of sockets 7a formed therein which are electrically connected to the leads 4 and 5. When the memory card is used, it is inserted into an unillustrated memory card reader, and the sockets 7a fit onto corresponding electrode pins of a connector of the memory card reader.

Figure 1:
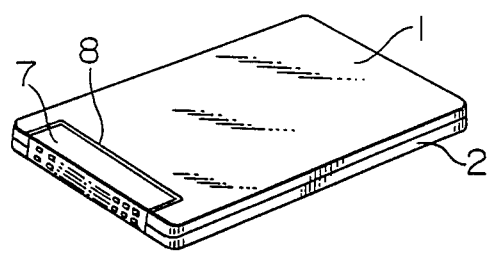
FIG. 1 is a perspective view of a conventional memory card of the type to which the present invention pertains.
Figure 2:
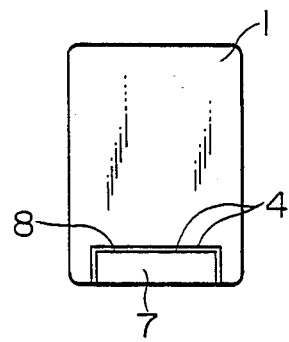
FIG. 2 is a top view of the conventional memory card to FIG. 1.
Figure 3:
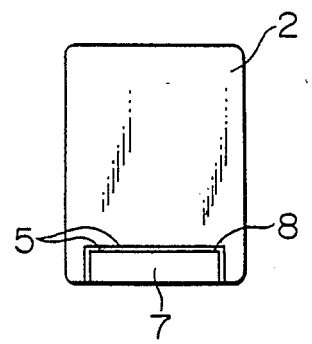
FIG. 3 is a bottom view of the conventional memory card of FIG. 1.
Figure 4:
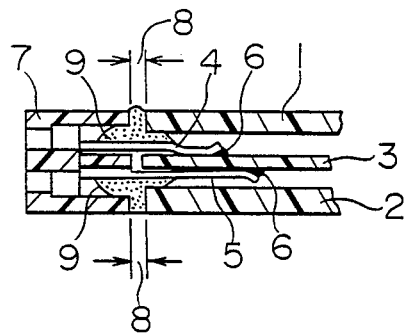
FIG. 4 is a longitudinal cross-sectional view of the left end of the conventional memory card of FIG. 1.

In contrast to the conventional package sections 1 and 2 of FIG. 1, the front ends of the package sections of this embodiment are equipped with portions which overlap the rear end of the connector 7 to prevent the formation of gaps. Namely, as best shown in FIG. 6, the upper package section 10 has a ledge 10b formed on its front end which overlaps the upper portion of the rear end of the connector 7, and the lower package section 11 has a similar ledge 11b formed on its front end which overlaps the lower portion of the rear end of the connector 7.

Figure 6:
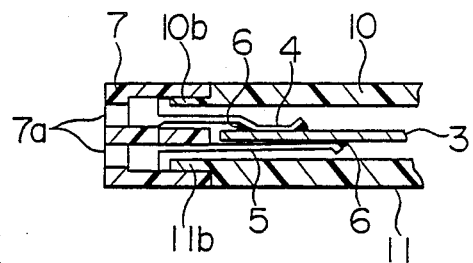
FIG. 6 is a longitudinal cross-sectional view of the left end of the embodiment of FIG. 5 after assembly thereof.

The memory card of FIG. 5 is assembled by first fitting the ledge 11b of the lower package section 11 into the rear end of the connector 7 as shown in FIG. 6 and securing it thereto, after which the ledge 10a of the upper package section 10 is inserted into the rear end of the connector 7, and the upper and lower package sections 10 and 11 are connected to each other by bonding. As the ledges 10a and 11b overlap the rear end of the connector 7, even if there is some clearance between the connector 7 and the front ends of the outer package sections, no gaps like those illustrated in FIG. 1 are formed. As a result, dirt and other contaminants are unable to enter into the outer package and produce electrical shorts. In addition, there is no danger of the semiconductor device which is mounted on the internal base 3 being damaged by static electricity. Accordingly, it is not necessary to apply a resin atop the leads 4 and 5, and manufacturing costs can be decreased.

Figure 7:
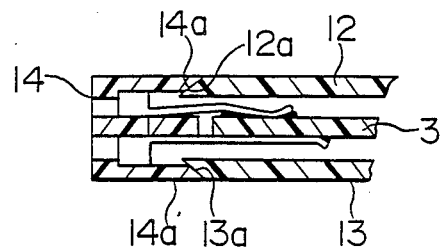
FIG. 7 is a longitudinal cross-sectional view of a portion of a second embodiment of the present invention.

FIG. 7 illustrates a portion of a second embodiment of the present invention in which the overlapping portions of the package sections which form an outer package and an electrical connector are in the form of chamfers. Namely, an upper package section 12 has a chamfer 12a formed on its front end which overlaps a chamfer 14a having a complementary shape which is formed on the top portion of the rear end of an electrical connector 14. Similarly, a lower package section 13 has a chamfer 13a formed on its front end which overlaps a chamfer 14a having a complementary shape which is formed on the lower portion of the rear end of the connector 14. The upper package section 12, the lower package section 13, and the connector 14 are otherwise identical in structure to the upper package section 10, the lower package section 11, and the connector 7 of the previous embodiment. This embodiment provides the same benefits as the previous embodiment.

Figure 8:
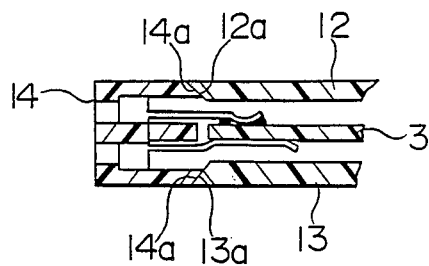
FIG. 8 is a longitudinal cross-sectional view of a variation of the embodiment of FIG. 7.

FIG. 8 illustrates a variation of the embodiment of FIG. 7 in which each of the chamfers 12a, 13a, and 14a slopes in the opposite direction from the corresponding chamfer of FIG. 7. The structure is otherwise identical to that of the embodiment of FIG. 7, and the same benefits are obtained.

What is claimed is:

1. A memory card comprising:
   a base for a semiconductor device;
   a semiconductor device which is mounted on said base;
   an electrical connector which has a front end and a rear end and which is electrically connected to said semiconductor device, said front end being electrically connectable to external equipment, said rear end including connector mounting surfaces; and
   an outer package which encloses said base and said semiconductor device, said outer package having a front end including an opening, an adjacent front edge forming part of the opening, and a rear end, said outer package comprising first and second package sections having front and rear ends, the first and second package section front ends each including a package mounting surface complementary to and joined to one of said connector mounting surfaces, said first and second package sections being stacked on and joined to each other, said electrical connector being disposed within the opening at the front edge of said outer package.

2. A memory card as claimed in claim 1 wherein said package mounting surfaces comprise a ledge on the front end which overlaps the connector mounting surface.

3. A memory card as claimed in claim 1 wherein said connector and package mounting surfaces are complementary chamfers.

4. A memory card as claimed in claim 2 wherein said complementary package and connector mounting surfaces are generally planar and substantially parallel to said base.

5. A memory card as claimed in claim 3 wherein said complementary package and connector mounting surfaces are generally planar and oblique to said base.

* * * * *